United States Patent [19]
Yan

[11] Patent Number: 5,381,327
[45] Date of Patent: Jan. 10, 1995

[54] ELECTRICAL POWER INVERTER

[75] Inventor: Cheng C. Yan, Kowloon, Hong Kong

[73] Assignee: Astec International, Ltd., Hong Kong

[21] Appl. No.: 34,496

[22] Filed: Mar. 19, 1993

[30] Foreign Application Priority Data

Mar. 19, 1992 [GB] United Kingdom ............... 9206022

[51] Int. Cl.⁶ .................... H02M 3/335; H02M 3/315
[52] U.S. Cl. ...................................... 363/24; 363/26; 363/25; 363/98
[58] Field of Search ................. 363/24, 25, 26, 39-41, 363/98, 132, 133, 134, 17, 56, 95, 97

[56] References Cited

U.S. PATENT DOCUMENTS

| | | | |
|---|---|---|---|
| 4,336,587 | 6/1982 | Boettcher, Jr. et al. | 363/24 X |
| 4,353,115 | 10/1982 | Ruble et al. | 363/42 |
| 4,388,562 | 6/1983 | Josephson . | |
| 4,430,628 | 2/1984 | Nilssen | 363/133 X |
| 4,665,475 | 5/1987 | Brandstatter | 363/26 X |
| 4,758,938 | 7/1988 | Kanazawa | 363/41 |
| 4,787,020 | 11/1988 | Hiramatsu et al. | 363/134 X |
| 4,879,640 | 11/1989 | Das | 363/41 |
| 4,939,633 | 7/1990 | Rhodes et al. | 363/98 |
| 5,014,176 | 5/1991 | Kelleher, Jr. et al. | 363/134 X |
| 5,111,374 | 5/1992 | Lai et al. | 363/41 X |

Primary Examiner—Steven L. Stephan
Assistant Examiner—E. To
Attorney, Agent, or Firm—McCubbrey, Bartels & Ward

[57] ABSTRACT

An electrical power inverter having an output voltage waveform that closely corresponds to a reference waveform under a wide range of load conditions is disclosed. The present invention allows for excess energy present at the output port of the electrical power inverter to be coupled back to the input port to maintain the correspondence of the output voltage waveform with the reference waveform when the inverter is providing power to inductive or light resistive loads. The electrical power inverter comprises an input port for receiving a unipolar input voltage and an output port for providing electrical energy to a load, a circuit for generating a reference waveform, a power converter for generating an output voltage at the output port having a waveform that approximately corresponds to the reference waveform, an energy return circuit for selectively coupling energy from the output port to the input port, and a controller for enabling said energy return circuit to selectively couple excess energy from the output port such that the output voltage waveform more closely corresponds to the reference waveform under a wide range of load conditions.

15 Claims, 6 Drawing Sheets

ELECTRICAL POWER INVERTER

FIELD OF THE INVENTION

The present invention relates to electrical power converters, and more particularly to electrical power converters that provide a varying output voltage.

BACKGROUND OF THE INVENTION

An electrical power converter is a device for processing electrical power from one form into another form that meets the requirements of an electrical system. Electrical power converters commonly are used to change alternating-current (AC) power to direct current (DC) power or vice versa, or to change one DC voltage level to another. A power converter that changes DC power to AC power is commonly referred to as an "inverter." A power converter that changes AC power to DC power is commonly referred to as a "rectifier." A variety of circuit topologies are used as the basis for power converters, including the well-known topologies referred to as buck, boost, buck-boost, push-pull, bridge, half-bridge and forward converters.

In many power converters, a switching regulator regulates the output signal of the converter by varying the amount of time that electrical energy is coupled from the converter's input to its output. To accomplish this function, the switching regulator controls one or more switches that govern the coupling of voltage and current from the input of the converter to key circuit elements within the power converter. The regulation process commonly is performed by a pulse width modulator that is responsive to the output voltage of the power converter. The pulse width modulator controls the amount of time the switches are ON (i.e., power is enabled to couple through the switches), thereby determining the pulse width of the current and voltage pulses coupled from the input of the converter. The pulse width, or length, of the input current and voltage pulses in turn affects the characteristics of the output voltage.

The characteristics of the output voltage waveform of a power converter are often important to the performance of the load device and to meet standard specifications. For general purpose power inverters, for example, a near-sinusoidal waveform with a total RMS harmonic content of not more than 5% of the fundamental value is often specified, as well as a 3% limit on any individual harmonic.

The ability of an inverter to maintain the appropriate output voltage waveform is, however, limited by the impedance characteristics of the load device. For example, when the power inverter is designed to produce a sinusoidal output voltage, inductive loads commonly cause harmonic distortion of the output voltage waveform. This effect occurs because power converters and inverters commonly have a capacitance at their output. Inductive loads cause the inverter's output current waveform to lag its voltage waveform so that current is coupled from the load to the inverter during a positive voltage half-cycle. The current returned from the load raises the voltage at the inverter's output capacitance, resulting in harmonic distortion of the output voltage waveform.

Similarly, resistive loads that are light (i.e., that draw little power in comparison to the power delivery capability of the inverter) can also cause distortion of the output voltage waveform. In such cases, the load does not draw sufficient power for the capacitor to discharge at an adequate rate when the reference waveform is decreasing. Thus, the decrease in the output voltage lags the decrease in the reference waveform, resulting in harmonic distortion of the output voltage waveform.

Accordingly, there is a need for an electrical power inverter for providing power to a load with an output voltage waveform that is less sensitive to the characteristics of the load.

SUMMARY OF THE INVENTION

The present invention recognizes that the output voltage waveform of a power inverter can be made less sensitive to the impedance characteristics of a load by providing a means for selectively coupling excess electrical energy from the output of the power inverter back to the input of the power inverter.

Broadly stated, the present invention is an electrical power inverter for providing electrical energy having an output voltage waveform that closely corresponds to a reference waveform under a wide range of load conditions. The electrical power inverter comprises an input port for receiving a source of electrical energy having a unipolar input voltage, and an output port for providing electrical energy to a load, means for generating a reference waveform, power conversion means for generating an output voltage at said output port having a waveform which approximately corresponds to said reference waveform, said power conversion means comprising an energy storage means coupled to said output port for storing energy at said output port and for generating said output voltage as a function of the amount of stored energy, and energy coupling means for coupling energy from said input port to said output port in amounts needed to supply energy to the load and to enable said energy storage means to generate said output voltage, energy return means for selectively coupling energy from said output port to said input port, and control means for enabling said energy return means to selectively couple excess energy from the output port such that the output voltage waveform more closely corresponds to said reference waveform under a wide range of load conditions, said excess energy being that energy which is in excess of the sum of the energy needed by the load plus the energy needed by said energy storage means to generate said output voltage.

An object of the present invention is, therefore, to provide an electrical power inverter having an output voltage that approximates a reference waveform.

Another object of the present invention is to provide an electrical power inverter that generates an output voltage having a waveform that approximates a reference waveform under a wide range of load conditions.

Still another object of the present invention is to provide an electrical power inverter with an output voltage having a waveform that approximates a reference waveform when the inverter is providing power to an inductive or light resistive load.

Yet another object of the invention is to provide an electrical power inverter allowing for bi-directional energy flow.

A further object of the present invention is to reduce the harmonic distortion of the output voltage of an electrical power inverter that is used to produce an approximately sinusoidal output voltage.

A still further object of the present invention is to provide an electrical power inverter with an approximately sinusoidal 50 Hz–60 Hz output voltage waveform and harmonic distortion of less than three percent.

Yet a further object of the present invention is to provide an electrical power inverter with an output voltage waveform that is approximately sinusoidal when the output of the inverter is coupled to a reactive or light resistive load.

These and other objects of the present invention will become apparent to those skilled in the art from the following detailed description of the invention and preferred embodiments, the accompanying drawings, and the appended claims.

DETAILED DESCRIPTION OF THE INVENTION AND PREFERRED EMBODIMENTS

Figure 1:
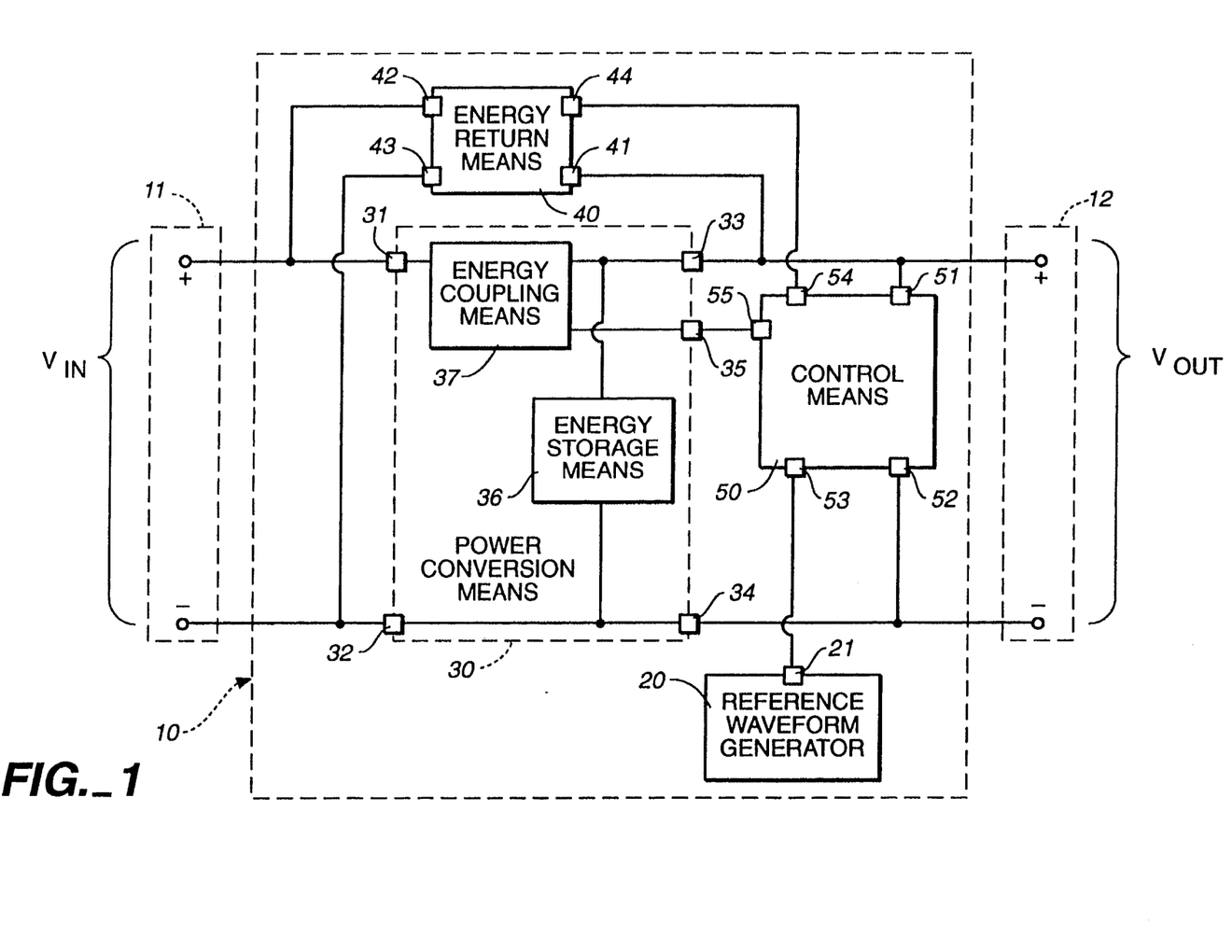
FIG. 1 is a block diagram of a first embodiment of an electrical power inverter according to the present invention.

A block diagram of an improved electrical power inverter according to the present invention is shown at 10 in FIG. 1. Electrical power inverter 10 includes an input port 11 for receiving a source of electrical energy having a unipolar input voltage, and an output port 12 for coupling electrical energy to a load. Port 11 has a positive terminal indicated with the symbol "+" and a negative terminal indicated with the symbol "−" in FIG. 1. The unipolar input voltage at port 11 is defined as a voltage that comprises simply a DC input voltage, or a predominantly DC input voltage with an AC component such that the voltage at the positive terminal of port 11 is not less than the voltage at the negative terminal of port 11. Port 12 has a positive terminal and a negative terminal for providing electrical energy having an output voltage waveform. These terminals are also indicated with the symbols "+" and "−", respectively, in FIG. 1.

Additionally, electrical power inverter 10 comprises a reference waveform generator 20 for generating a reference waveform. Reference waveform generator 20 has an output 21 for providing the reference waveform. In a preferred embodiment, the reference waveform is periodic and has a reference frequency.

Electrical power inverter 10 further comprises a power conversion means 30 coupled between input port 11 and output port 12 for providing electrical energy at output port 12 having a varying output voltage which approximately corresponds to the reference waveform. Power conversion means 30 includes inputs 31 and 32 for receiving the unipolar input voltage where input 31 is coupled to the positive terminal of input port 11 and input 32 is coupled to the negative terminal of input port 11, and outputs 33 and 34 for providing the output voltage where output 33 is coupled to the positive terminal of output port 12 and output 34 is coupled to the negative terminal of output port 12.

Power conversion means 30 also includes an input 35 for receiving a signal that is a function of the reference waveform for enabling conversion means 30 to generate the output voltage in approximate correspondence with the reference waveform. It may be appreciated that, in many embodiments, the signal received by conversion means 30 at input 35 may be simply the reference waveform itself. In many other embodiments, however, the signal received at input 35 is a signal generated by a control means which is responsive to the reference waveform. In electrical power inverter 10, input 35 receives a signal generated by control means 50, which is described below.

Power conversion means 30 also comprises an energy storage means 36 and an energy coupling means 37. Energy storage means 36 is coupled to output port 12. Means 36 stores energy at port 12 and generates the output voltage at port 12 as a function of the amount of stored energy. Energy coupling means 37 couples energy from input port 11 to output port 12 in amounts needed to supply energy to the load and to enable energy storage means 36 to generate the output voltage in approximate correspondence with the reference waveform.

Electrical power inverter 10 further comprises an energy return means 40 for selectively coupling electrical energy from output port 12 to input port 11 such that the output voltage waveform more closely corresponds to the reference waveform. Energy return means 40 includes an input 41 coupled to output port 12 for receiving electrical energy from output port 12, and outputs 42 and 43 coupled to the positive and negative terminals of input port 11, respectively, for providing electrical energy received at input 41 to input port 11. Energy return means 40 also includes input 44 for receiving a signal that is a function of the reference waveform that enables energy return means 40 to couple energy from port 12 to port 11 to improve the correspondence of the output voltage waveform to the reference waveform.

Electrical power inverter 10 further comprises a control means 50 for controlling conversion means 30 such that it generates an output voltage that approximately corresponds to the reference waveform and for enabling energy return means 30 to selectively couple excess energy for output port 12 to input port 11 such that the output waveform more closely corresponds to the reference waveform. Excess energy is defined to be energy that is substantially in excess of the sum of the energy needed by the load plus the energy needed by energy storage means 37 to generate the output voltage having a waveform in approximate correspondence with the reference waveform.

Control means 50 includes input 51 coupled to the positive terminal of output port 12 and input 52 coupled to the negative terminal of output port 12 for receiving measure of the output voltage. Control means 50 also includes input 53 coupled to output 21 of waveform generator 20 for receiving the reference waveform $V_{REF}$. Control means 50 also includes output 55 coupled to input 35 of power conversion means 30 for providing a signal that controls power conversion means 30 such that it generates the output voltage waveform in approximate correspondence with the reference waveform. Control means 50 also includes output 54 for providing a signal that enables energy return means 40 to selectively couple excess energy from output port 12 such that the output voltage waveform more closely corresponds to the reference waveform under a wide range of load conditions.

It may be appreciated that control means 50 may comprise two separate control means where one control means controls power conversion means 30 and the other control means controls energy return means 40. In a preferred embodiment, however, component count can be reduced by having a single control means that controls both power conversion means 30 and energy return means 40.

It may also be appreciated that inputs 51 and 52 of control means 50 are not necessary in all embodiments of the present invention. In such embodiments, control means 50 is not responsive to the output voltage. In a preferred embodiment, however, control means 50 is responsive to both the output voltage and the reference waveform.

A general description of the functional blocks of electrical power inverter 10 according to the present invention has thus far been given. The operation of the present invention will be described further below with regard to FIG. 2 and in connection with further embodiments.

Figure 2:
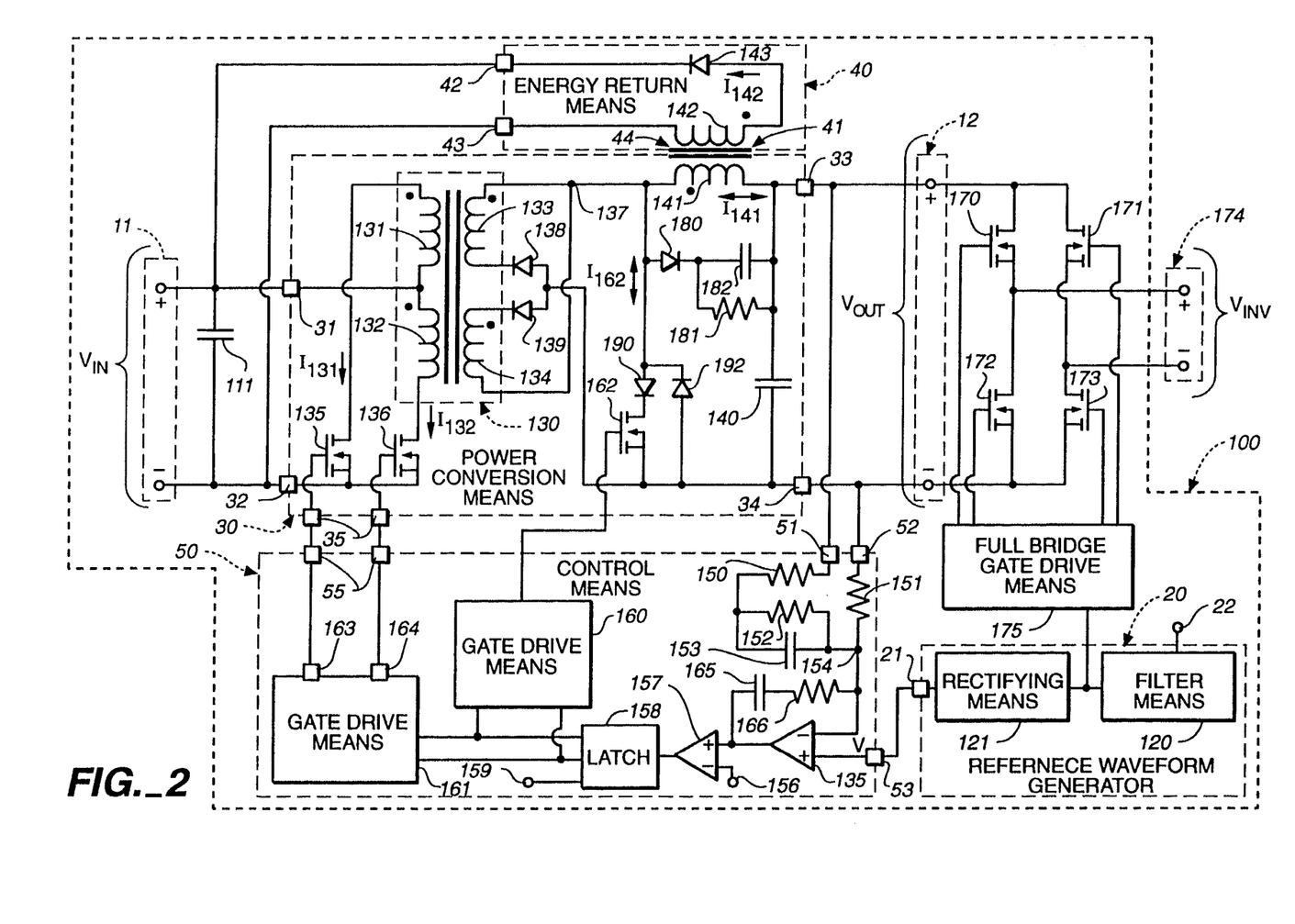
FIG. 2 is a combined block and circuit diagram of a second embodiment of an electrical power inverter according to the present invention.

A circuit diagram for a preferred embodiment of an electrical power inverter according to the present invention is shown at 100 in FIG. 2. In this embodiment, electrical power inverter 100 comprises each of the elements of electrical power inverter 10 shown in FIG. 1, except that energy storage means 36 and energy coupling means 37 are not identified as such in FIG. 2. The numbering of all such elements which were previously discussed in connection with FIG. 1 is identical to their numbering in FIG. 1, except where alternative numbering is necessary to explain additional aspects of electrical power inverter 100 not shown in FIG. 1.

In this embodiment, reference waveform generator 20 generates a periodic reference waveform having a reference frequency, preferably a rectified sinusoid in the 50 Hz to 60 Hz range.

In addition to the elements which were previously described in connection with electrical power inverter 10, electrical power inverter 100 includes a conventional push-pull inverter input stage for generating the voltage needed by the inverter 100. The push-pull inverter includes a first transformer 130 having a first primary winding 131 and a second primary winding 132, each coupled to the positive terminal of input port 11 as shown in FIG. 2, and a first secondary winding 133 and a second secondary winding 134. The push-pull inverter further comprises a first switch means 135 coupled to primary winding 131 for alternately enabling electrical energy to couple from input port 11 to first primary winding 131 at a switching frequency substantially greater than the reference frequency, and a second switch means 136 for alternately enabling electrical energy to couple from input port 11 to second primary winding 132 at a switching frequency substantially greater than the reference frequency. First switch means 135 and second switch means 136 each have ON states in which electrical energy is enabled to couple to first primary winding 131 and second primary winding 132, respectively, and OFF states in which electrical energy is substantially prevented from coupling to first primary winding 131 and second primary 132, respectively. Switch means 135 and switch means 136 are synchronized such that switch means 135 and switch means 136 are not in their respective ON states at the same time. In a preferred embodiment, switch means 135 and 136 comprise metal-oxide semiconductor field-effect transistors, which are commonly referred to as MOSFETs.

The push-pull inverter further comprises a node 137 coupled to both first secondary winding 133 and second secondary winding 134, as shown in FIG. 2. Electrical power inverter 100 further comprises a first rectifier 138 coupled to first secondary winding 133 such that electrical energy is enabled to couple substantially only in the direction from first secondary winding 133 to node 137, and a second rectifier 139 coupled to second secondary winding 134 such that electrical energy is enabled to couple substantially only in the direction from second secondary winding 134 to node 137.

Electrical power inverter 100 further comprises an inductor 141 coupled between node 137 and the positive terminal of output port 12. Electrical power inverter 100 further comprises a capacitor 140 coupled to output port 12 such that electrical energy coupled to output port 12 is enabled to be stored on capacitor 140, where capacitor 140 has an output voltage that is a function of the amount of energy stored.

As is well known in the art, switch means 135 and switch means 136 may be controlled such that the electrical energy stored on capacitor 140 is increased at a predetermined rate, resulting in the output voltage generated by capacitor 140 being increased at a predetermined rate. Similarly, where output port 12 is coupled to a load that draws enough power so that capacitor 140 discharges at a sufficient rate, switch means 135 and switch means 136 may be controlled such that the output voltage of capacitor 140 is enabled to decrease at a predetermined rate. A load which draws enough power to allow for an adequate discharge rate is referred to as a "heavy" load. By varying the duration of the ON states and the OFF states of switch means 135 and switch means 136, the output voltage of capacitor 140 can be caused to approximately correspond to a predetermined waveform, such as the reference waveform generated by reference waveform generator 20.

Electrical power inverter 100 further comprises a second inductor 142 that is magnetically coupled to inductor 141 in a flyback relationship. Second inductor 142 is further coupled to input port 11. Electrical power inverter 100 further comprises a rectifier 143 coupled to second inductor 142 such that electrical energy is enabled to couple through inductor 142 substantially only in the direction from said secondary winding to input port 11. As will be explained further below in connection with the operation of electrical power inverter 100, inductor 142 and rectifier 143, together with inputs 41 and 44 and outputs 42 and 43, collectively comprise energy return means 40.

In a preferred embodiment, power inverter 10 functions as a push-pull inverter circuit with a 100 Hz full-wave rectified sinusoidal output voltage corresponding to a 100 Hz full-wave rectified reference waveform generated by generator 20. The output voltage is then inverted by a bridge inverter during alternate voltage cycles, as explained below, to produce a 50 Hz sinusoidal voltage signal. Reference waveform generator 20 generates said 100 Hz full-wave rectified reference waveform from a square-wave received at input 22 which is, in a preferred embodiment, a square-wave with a frequency of approximately 50 Hz. The signal received at input 22 is filtered through a filter means 120, such as a 50 Hz six-order Butterworth filter, to produce an approximately sinusoidal waveform. This sinusoidal waveform is then coupled through a rectifying means 121 that comprises a full-wave rectifier to output 21 such that the reference waveform generated at output 21 approximates a full-wave rectified sinusoid with a reference frequency of 100 Hz.

In this embodiment, control means 50 comprises resistors 150, 151, and 152, and capacitor 153, which collectively comprise a voltage divider that produces a voltage at node 154 which is approximately proportional to the output voltage at port 12. The voltage at node 154 is compared against the reference waveform $V_{REF}$ by a differential amplifier 155, having a feedback loop well-known in the art comprising a series combination of capacitor 165 and resistor 166. Amplifier 155 produces an output signal proportional to the difference between the output voltage and the reference waveform. The output signal of amplifier 155 is compared by a conventional comparator 157 against a periodic, high frequency (preferably 20 KHz) linear voltage ramp signal of a type well-known in the art, received at input 156. This voltage signal has a period T. The output signal of comparator 157 is high until the ramp voltage exceeds the output voltage of comparator 157. The length of time this takes is therefore proportional to the difference between the output voltage and the reference waveform.

The output of comparator 157 is received by a latch 158, which also receives a conventional 20 KHz clock signal at input 159. The outputs of latch 158 are coupled to gate drive means 160 and gate drive means 161. Gate drive means 160 provides a conventional output signal which controls a switch means 162, preferably a MOSFET, which is coupled between node 137 and the negative terminal of output port 12. Gate drive means 161 provides conventional control signals for controlling in a non-overlapping anti-phase manner first switch means 135 and second switch means 136 of the push-pull inverter. Specifically, gate drive means 161 has a first output 163 at which it generates a signal that controls first switch means 135, preferably a MOSFET, and a second output 164 at which it generates a signal that controls switch means 136, preferably a MOSFET. The switching frequency of the switch means described above is in the 20 KHz range. In operation, control means 50 periodically sends voltage signals to switch means 135, 136, and 162 sufficient to turn these switch means ON so that electrical energy is periodically enabled to couple through them. Switch means 135, 136, and 162 are controlled such that only one of them is ON at a given time, and such that the switch means are turned on in the following sequence: means 135, means 162, means 136, means 162. This sequence repeats, as illustrated in FIGS. 4A through 4G and FIGS. 5A through 5H which are described below.

In a preferred embodiment of the present invention, a diode 190 is added in series with switch means 162 to block the body diode of this MOSFET. This forces the free wheeling current to flow through a second diode 192.

When either of switch means 135 or 136 is ON, switch means 162 is turned OFF. Electrical energy is coupled through transformer 130 to inductor 141, causing the electrical current through inductor 141 to increase. The current through inductor 141 is coupled to capacitor 140 and to output port 12. In turn, the output voltage stored on capacitor 140 increases. When either of switch means 135 and 136 are turned OFF, switch means 162 is turned ON and diode 192 enables the current flowing through inductor 141 to continue flowing to output port 12 and capacitor 140. The current through inductor 140 decreases gradually to zero. Output capacitor 140 is then discharged through inductor 141, diode 190, and switch means 162. Therefore, the output voltage decreases. The energy stored in inductor 141 is coupled through winding 142 and diode 143 to capacitor 111 when switch means 162 is turned OFF. Increasing the proportion of ON time of switch means 135 and 136 sufficiently relative to the ON time of switch means 162 causes the output voltage to gradually rise over time at a selected rate. Similarly, decreasing the ON time of switch means 135 and 136 sufficiently relative to the ON time of switch means 162 causes the output voltage to gradually decrease at a predetermined rate. Thus, by controlling the duration of the ON time, the voltage at output 12 can be made to follow the reference waveform generated by generator 20. The circuitry of control means 50, as described above, enables this by comparing the output voltage $V_{OUT}$ with the voltage of the reference waveform.

Electrical power inverter 100 further comprises switch means 170–173 configured as a bridge inverter coupled to output port 12. The outputs of the bridge inverter comprising switch means 170–173 is provided at inverter output port 174, which has a positive terminal indicated with a "+" and a negative terminal indicated with a "−" in FIG. 2. More specifically, switch means 170 is coupled between the positive terminal of output port 12 and the positive terminal of inverter output port 174. Switch means 171 is coupled between the positive terminal of output port 12 and the negative terminal of inverter output port 174. Switch means 172 is coupled between the negative terminal of output port 12 and the positive terminal of inverter output port 174. Switch means 173 is coupled between the negative terminal of output port 12 and the negative terminal of inverter output port 174.

Switch means 170–173 are controlled in a conventional manner by full bridge gate drive means 175 such that they switch at a switching frequency of approximately 50 Hz from a first state in which electrical energy is permitted to couple only through switch means 170 and switch means 173 and a second state in which electrical energy is permitted to couple only through switch means 171 and switch means 172. The bridge inverter which comprises switch means 170–173 therefore produces an inverter output voltage at inverter output port 174 which comprises the output voltage at output port 12 alternatively inverted at an approximately 50 Hz rate. The inverter output voltage waveform is synchronized with the reference waveform such that switch means 170–173 switch between their first state and their second state at the end of each voltage cycle of the reference waveform. This synchronization is enabled because full bridge gate drive means 175 receives a reference 50 Hz signal from the output of filter means 120.

Electrical power inverter 100 further comprises a capacitor 111 coupled between the positive and negative terminals of input port 11 for storing energy returned to input port 11 by energy return means 40.

A preferred embodiment of electrical power inverter 100 is used in an off-line UPS wherein the output voltage is 230 $V_{RMS}$ at 50 Hz. Circuit elements described above have the following exemplary values:

| $V_{IN}$ | | 600 VA OFF-LINE UPS 48 $V_{DC}$ |
|---|---|---|
| 111 | Poly Cap. | 1μ 63 V |
| 135, 136 | MOSFET | 150 V 30 A |
| 143 | ULTRA FAST | 100 V 3 A |
| 138, 139 | ULTRA FAST | 700 V 3 A |
| 190 | | 50 V 3 A |
| 162 | MOSFET | 800 V 4 A |
| 192 | ULTRA FAST | 800 V 4 A |
| 180 | ULTRA FAST | 1 kV 1 A |
| 182 | | 10 n 1 kV |
| 181 | | 56k 3 W |
| 140 | POLY CAP. | 2.2μ 400 V |
| 170, 171, 172, 173 | MOSFET | 400 V 10 A |

In a preferred embodiment, transformer 130 is a ferrite core power transformer (ETD44) and the transformer comprising inductors 141 and 142 is an iron power core choke (E168). Capacitor 140 is preferably a DC polyester capacitor. Also in a preferred embodiment, conventional snubber circuits comprising a series combination of a resister and capacitor are coupled from the input to the output of each of the following circuit elements: switch means 135, switch means 136, rectifier 138, and rectifier 139. The snubber circuits for switch means 135 and 136 further comprise a diode coupled in parallel with the resistor and oriented to allow current to flow from transformer 130 to the negative terminal of input port 11. Additionally, in a preferred embodiment, a snubber circuit comprising diode 180, resistor 181, and capacitor 182 is coupled from node 137 to the positive terminal of output port 12, as shown in FIG. 2. Diode 180 is coupled to node 137 such that electrical energy can flow substantially only in the direction from node 137 to output port 12. Resistor 181 and capacitor 182 are coupled in parallel between diode 180 and output port 12.

Figure 3A:
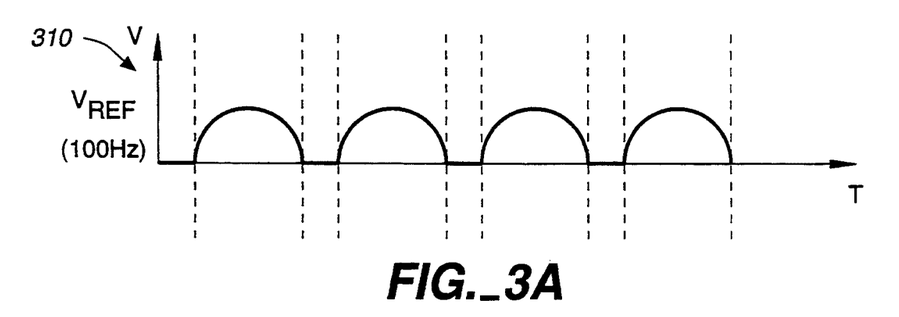
FIGS. 3A through 3D are timing diagrams showing key voltages and currents of the electrical power inverter shown in FIG. 2
Figure 3B:
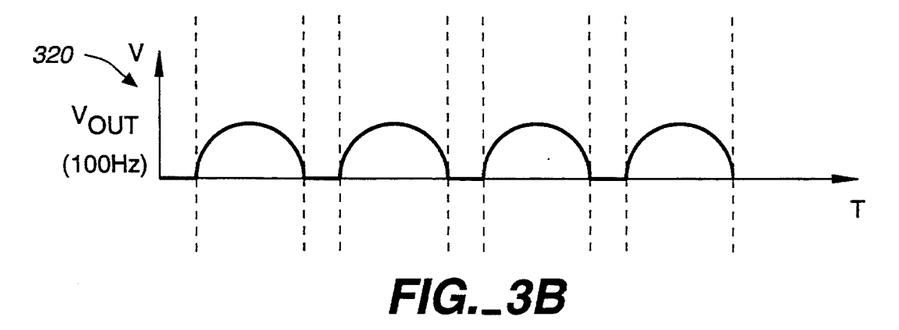
Figure 3C:
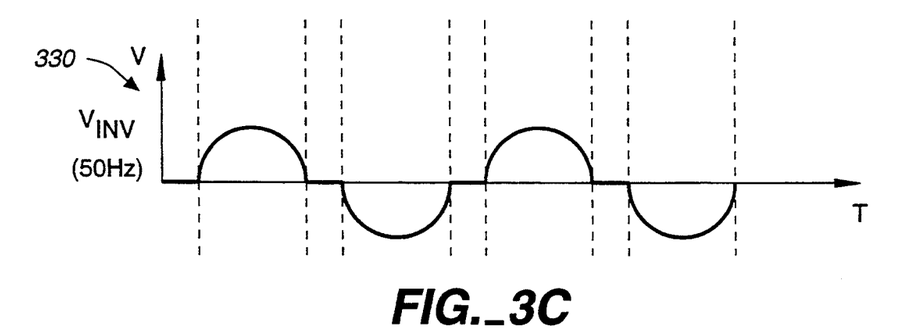

In a preferred embodiment, the input voltage received at input port 11 is a DC voltage, the reference voltage $V_{REF}$ at input 53 has a waveform that approximates a full-wave rectified sinusoid having a frequency of 100 Hz, which is shown in timing diagram 310 of FIG. 3A. The output voltage $V_{OUT}$ therefore, also approximates a full-wave rectified sinusoid with a frequency of approximately 100 Hz, which is shown in timing diagram 320 of FIG. 3B. The inverter output voltage $V_{INV}$ has a waveform approximating a sinusoid having a frequency of 50 Hz, as shown in timing diagram 330 of FIG. 3C. FIGS. 3A, 3B and 3C depict the relevant voltages during the same time period. The eight dashed lines in each of these figures represents the same eight instants of time in each of these figures.

Figure 3D:
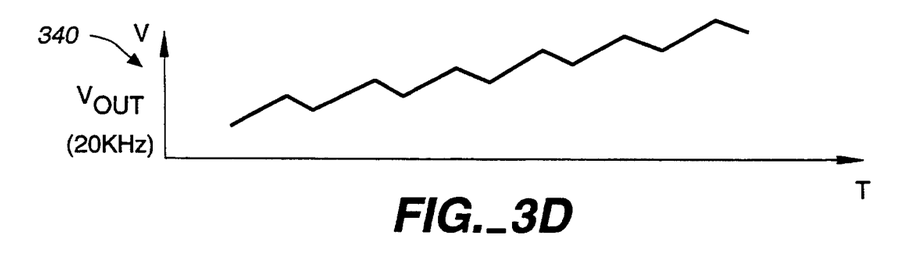
Figure 4A:
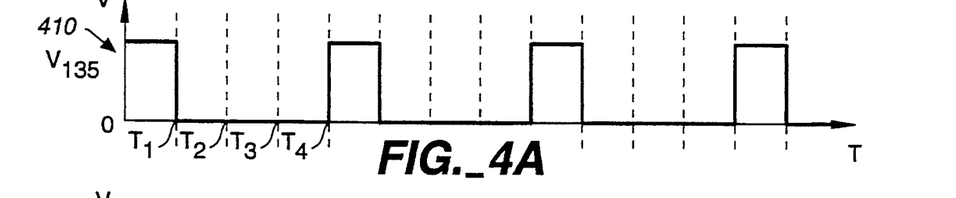
FIGS. 4A through 4G are timing diagrams showing key voltages and currents of the electrical power inverter shown in FIG. 2 operating in continuous mode.
Figure 4B:
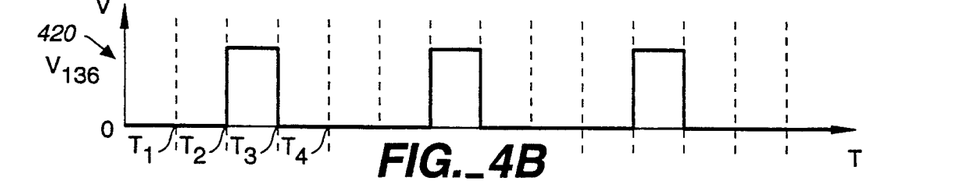
Figure 4C:
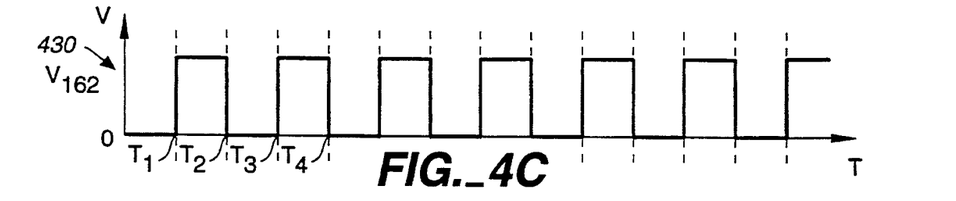
Figure 4D:
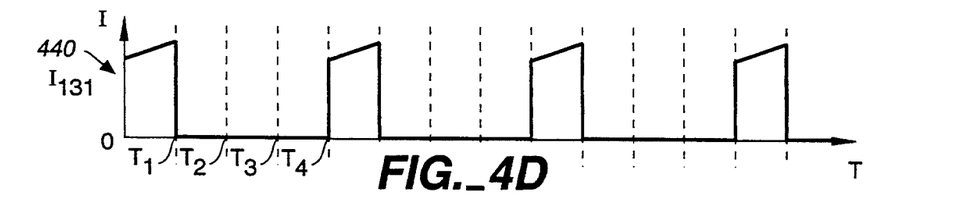
Figure 4E:
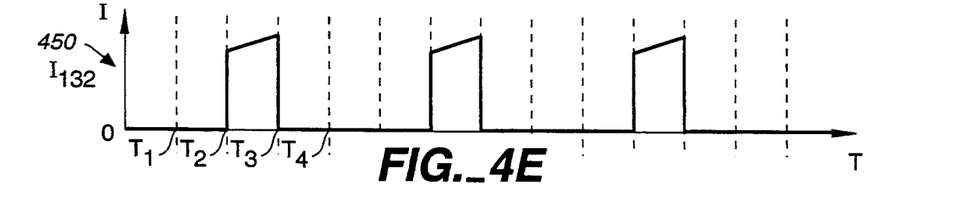
Figure 4F:
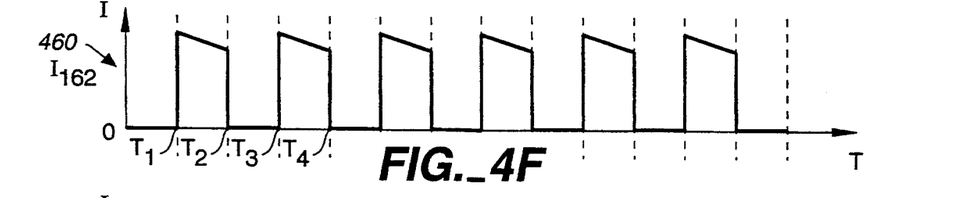
Figure 4G:
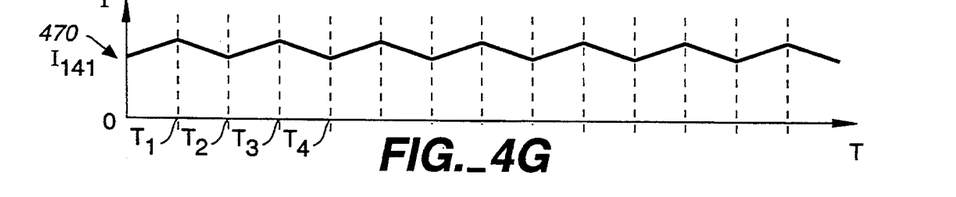

To generate the output voltage $V_{OUT}$, switch means 135, 136, and 162 are controlled by control means 50 such that electrical energy is alternately coupled through inductor 141 to capacitor 140 and from capacitor 140 to either output port 12 or node 137, depending on the load condition. The switch means are operated at a frequency substantially greater than the reference frequency, such as a frequency of 20 KHz where the reference frequency is approximately 100 Hz. As explained above, this causes the voltage stored on capacitor 140 (i.e., the output voltage $V_{OUT}$) to alternately ramp up and ramp down at a frequency substantially greater than the reference frequency, such as a frequency of 20 KHz. Control means 50 further causes the output voltage to approximate the reference waveform by varying the duration of the ON states and OFF states of switch means 135, 136, and 162 so that the output voltage peaks of the 20 KHz ramps are modulated to the reference waveform. For example, electrical energy is enabled to coupled to capacitor 140 for longer periods when the reference voltage waveform is increasing, allowing the output voltage to increase as well. The output voltage ($V_{OUT}$) during an exemplary rise in the voltage of the reference waveform ($V_{REF}$) is shown in timing diagram 340 of FIG. 3D. The switching frequencies of switch means 135, 136 and 162 are substantially greater than the reference frequency of 100 Hz and the amplitudes of the voltage waveforms are small in comparison to the output voltage waveform. Thus, these high frequency voltage variations shown in diagram 340 do not cause significant harmonic distortion of the output voltage waveform at the 100 Hz level.

Electrical power inverter 100 operates in two distinct modes that are referred to as the continuous mode and the discontinuous mode. In the continuous mode, electrical current couples through inductor 141 to output port 12 continuously in a forward direction. In the discontinuous mode, there are periods in which no current is coupled through inductor 141 or current is conducted in a reverse direction from output port 12 to node 137 through inductor 141.

When a heavy resistive load is coupled to the inverter's output, power inverter 100 operates in continuous mode. A heavy resistive load is a load that draws sufficient power to allow capacitor 140 to discharge through the load where necessary to maintain approximate correspondence between the output voltage waveform and the reference waveform. Under such load conditions, electrical energy is never coupled in the reverse direction from output port 12 through inductor 141 to node 137, and return means 40 does not take part in the inverter's operation. In such a case, power inverter 100 functions as an ordinary push-pull inverter circuit with a 100 Hz full-wave rectified sinusoidal output voltage. This full-wave rectified sinusoidal output voltage is inverted during alternate voltage cycles to become an approximately sinusoidal voltage $V_{INV}$ with a frequency of 50 Hz at inverter output port 174.

The detailed operation and timing relationship of key voltages and currents during the continuous mode operation of power inverter 100 are illustrated in FIGS. 4A through 4G for a relatively flat portion of a reference waveform. FIGS. 4A through 4G depict the relevant voltages and currents during the same time period. The dashed lines shown in FIGS. 4A through 4G represent the same instants of time in each of these figures. It may be appreciated that at the 20 KHz switching frequency, the reference waveform may be approximated by such a DC voltage level for the relatively small number of switching cycles shown in FIGS. 4A through 4G.

Timing diagrams 410, 420, and 430 show the voltage signals ($V_{135}$, $V_{136}$ and $V_{162}$) applied to the gates of switch means 135, 136, and 162, respectively, during continuous mode operation. The peak voltages are sufficient to turn the switches ON. Diagrams 410, 420, and 430 illustrate the switching sequence described above, which description will not be repeated here. Timing diagrams 440, 450, and 470 show the magnitudes of the current flowing through winding 131 ($I_{131}$), winding 132 ($I_{132}$), and inductor 141 ($I_{141}$), respectively, when electrical power inverter 100 is operating in continuous mode. Timing diagram 460 shows the total current $I_{162}$ drawn by inductor 141 from node 137 and diode 192 when switch means 135 and 136 are OFF. All of the diagrams show the same time period, with $t_1$, $t_2$, $t_3$, and $t_4$ being specific instants of time. The directions of currents $I_{131}$, $I_{132}$, and $I_{141}$ are shown in FIG. 2, along with $I_{142}$ and $I_{162}$, which are described below.

As shown in FIGS. 4A through 4G, from $t=0$ to $t=t_1$, a voltage is applied to the gate of switch means 135, allowing current to couple through winding 131, and inductor 141, at a rate which gradually increases due to the well-known characteristics of inductors. As explained above, the current from inductor 141 causes the voltage at capacitor 140 to increase.

At $t=t_1$, switch means 135 is turned OFF and diode 192 is turned ON. Thus, from $t=t_1$ to $t=t_2$, the current through inductor 141 gradually decreases by drawing current from node 137 and switch means 162. During this time period, the output voltage also decreases. During the time period from $t=t_2$ to $t=t_3$ the operation of power inverter 100 is similar to the time period from $t=0$ to $t=t_1$, described above, except that current is coupling through switch means 136 rather than switch means 135. During the time period $t=t_3$ to $t=t_4$, the operation of power inverter 100 is identical to the time period $t=t_1$, to $t=t_2$, described above.

When inverter output port 174 is coupled to a light resistive load, or no load, power inverter 100 operates in a discontinuous mode during selected portions of the reference waveform cycle. A light resistive load is a load that does not draw sufficient power for capacitor 140 to discharge through the load quickly enough to allow the output voltage to correspond with the reference waveform. Power inverter 100 also operates in a discontinuous mode when an inductive load is coupled to inverter output port 174 such that electrical energy is coupled from the load to output port 12 at times when capacitor 140 is required to discharge in order to maintain the correspondence between the output voltage and the reference voltage waveforms.

Under such load conditions, if energy return means 40 and switch means 162 did not exist, it would be difficult or impossible to maintain close correspondence between the output voltage waveform and the reference waveform because there would be no way for capacitor 140 to discharge at an adequate rate. In many cases, the output voltage would simply approximate a DC voltage because capacitor 140 would charge up to a maximum voltage and could not discharge in order to maintain the correspondence between the output voltage waveform and the reference waveform. In this case, capacitor 140 would store energy in excess of that needed to generate the desired sinusoidal waveform. It may be appreciated that if the output voltage approximates a DC voltage, then the inverter output voltage would approximate a square wave. Even if capacitor 140 were allowed to discharge at a rate slower than necessary to maintain correspondence between the output voltage waveform and the reference waveform, the output voltage waveform would be distorted in comparison with the reference waveform.

Return means 40, which is controlled by control means 50 by way of switch means 162, improves the correspondence of the output voltage waveform with the reference waveform for inductive and light resistive load conditions by enabling capacitor 140 to discharge excess energy back to input port 11. As indicated above, switch means 135, 136 and 162 are controlled by control means 50 such that means 162 is in its ON state when 135 and 136 are in their OFF states. When excess energy is present at capacitor 140, the voltage $V_{OUT}$ is higher than normal and causes control means 50 to reduce the ON time of switch means 135 and 136 and increase the ON time of switch means 162. The increased ON time of switch means 162 enables capacitor 140 to apply a negative voltage to inductor 141 for a longer time, enabling it to reverse the direction of current flow through inductor 141, thereby enable energy to be coupled from capacitor 140 to inductor 141. This returned energy is stored in the form of magnetic flux in the return transformer, defined as inductors 141 and 142. When switch means 162 is next switched to its OFF state, the energy stored in the return transformer will couple from inductor 142 through rectifier 143 to input port 11. As a result, capacitor 140 is permitted to discharge at a sufficient rate to maintain the correspondence between the output voltage waveform and the reference waveform, but the energy discharging from capacitor 140 is returned to input port 11 so that it is not wasted. The detailed operation and timing relationship of switching elements, as well as key voltages and currents, are described below in connection with FIGS. 5A through 5H. The orientation of rectifier 143 is chosen such that energy is not returned to input port 11 as long as a continuous forward current flows through inductor 141 from node 137 to output port 12.

Timing diagrams 510, 520, and 530 show the voltages applied to the gates of switch means, 135 ($V_{135}$), switch means 136 ($V_{136}$) and switch means 162 ($V_{162}$) and diode 192, respectively. Timing diagrams 540, 550, 560, 570 and 580 show the magnitudes of the currents through switch means 135 ($I_{135}$), switch means 136 ($I_{136}$), switch means 162 ($I_{162}$), inductor 141 ($I_{141}$) and inductor 142 ($I_{142}$), respectively. Each of the diagrams shown in FIGS. 5A through 5H show the same time period with $t_1$, $t_2$, $t_3$ and $t_4$ indicating specific instants of time. The dashed lines shown in FIGS. 5A through 5H represent the same instants of time in each of these figures.

From $t=0$ to $t=t_1$ switch means 135 is ON, allowing the currents through winding 131 and inductor 141 to ramp up as shown in timing diagrams 540 and 570 in a similar manner to that described in connection with FIGS. 4A through 4G.

Figure 5A:
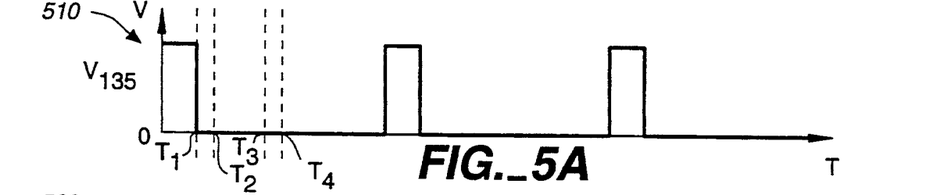
FIGS. 5A through 5H are timing diagrams showing of key voltages and currents of the electrical power inverter shown in FIG. 2 operating in discontinuous mode.
Figure 5B:
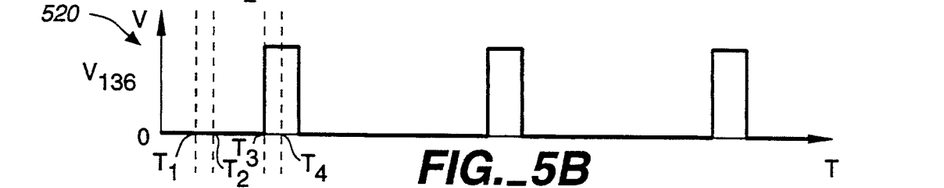
Figure 5C:
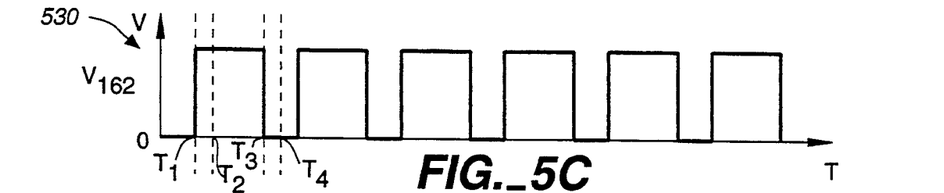
Figure 5D:
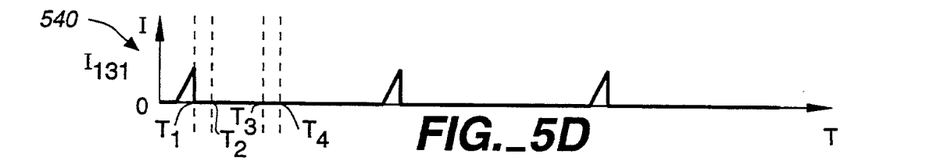
Figure 5E:
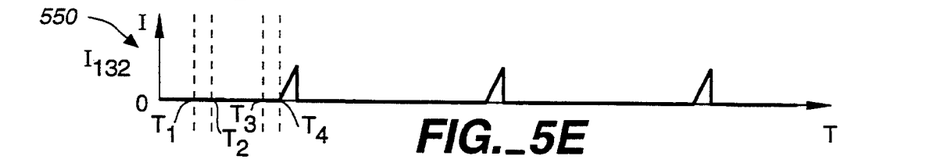
Figure 5F:
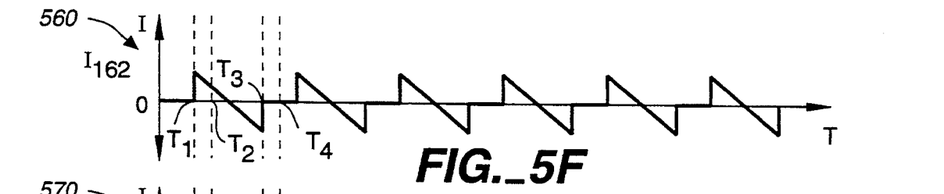
Figure 5G:
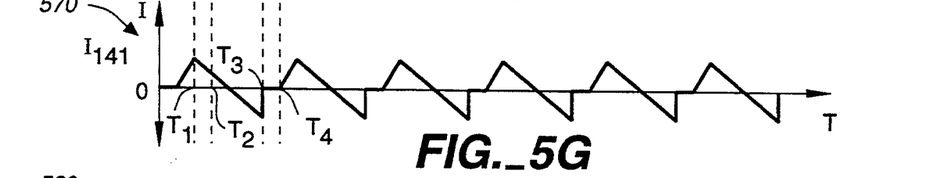
Figure 5H:
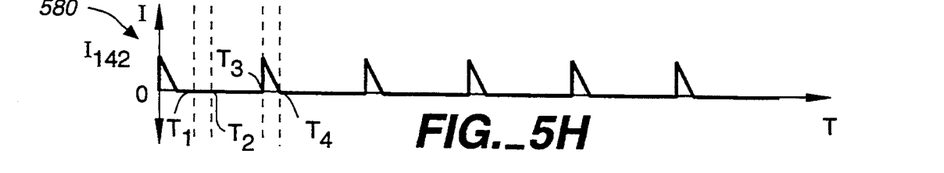

From $t=t_1$ to $t=t_2$, diode 192 is ON as shown in diagram 530 and the current through inductor 141 gradually decreases after switch means 135 is turned OFF by drawing current through node 137 and switch means 162, as shown in timing diagrams 560 and 570.

From $t=t_2$ to $t=t_3$, current is coupled from output port 12 through inductor 141 and switch means 162 as shown in timing diagrams 560 and 570 because, as explained above, the load is not drawing sufficient current from output port 12 to allow capacitor 140 to discharge through the load. As explained above, the current which is coupled through inductor 141 causes energy to be stored in the form of magnetic flux through inductor 141 and inductor 142. At $t=t_3$, switch means 162 is turned OFF, as shown in timing diagram 530. This causes the current passing through inductor 141 and switch means 162 to immediately cease, as shown in timing diagrams 560 and 570, causing the voltage across inductor 141 to rise. As inductor 142 is coupled in a flyback relationship to inductor 141, the magnetic flux generated by the current through inductor 141 generates a current in inductor 142 which flows through rectifier 143 to input port 11 during the time period $t=t_3$ to $t=t_4$ as shown in timing diagram 580.

The above discussion assumes the energy will not flow simultaneously in two directions, that is energy will not flow through inductor 141 to capacitor 140 and through inductor 142 to capacitor 111 simultaneously. This can be achieved by choosing turn ratios for windings 131,132, 133, 134 and the turn ratio of inductor 141 to inductor 142 such that the total turns of windings 133 and 134 times the turns of inductor 142 is less than the total turns of windings 131 and 132 times the turns of inductor 141.

It may be appreciated that power inverter 100 has bi-directional energy flow. In a preferred embodiment, power inverter 100 provides an inverter output voltage $V_{INV}$ that is approximately sinusoidal with a total harmonic distortion of less than 3%. As explained above, the output voltage waveform closely corresponds to the reference waveform under a wide range of load conditions, including inductive loads, light resistive loads, and no load.

Figure 6:
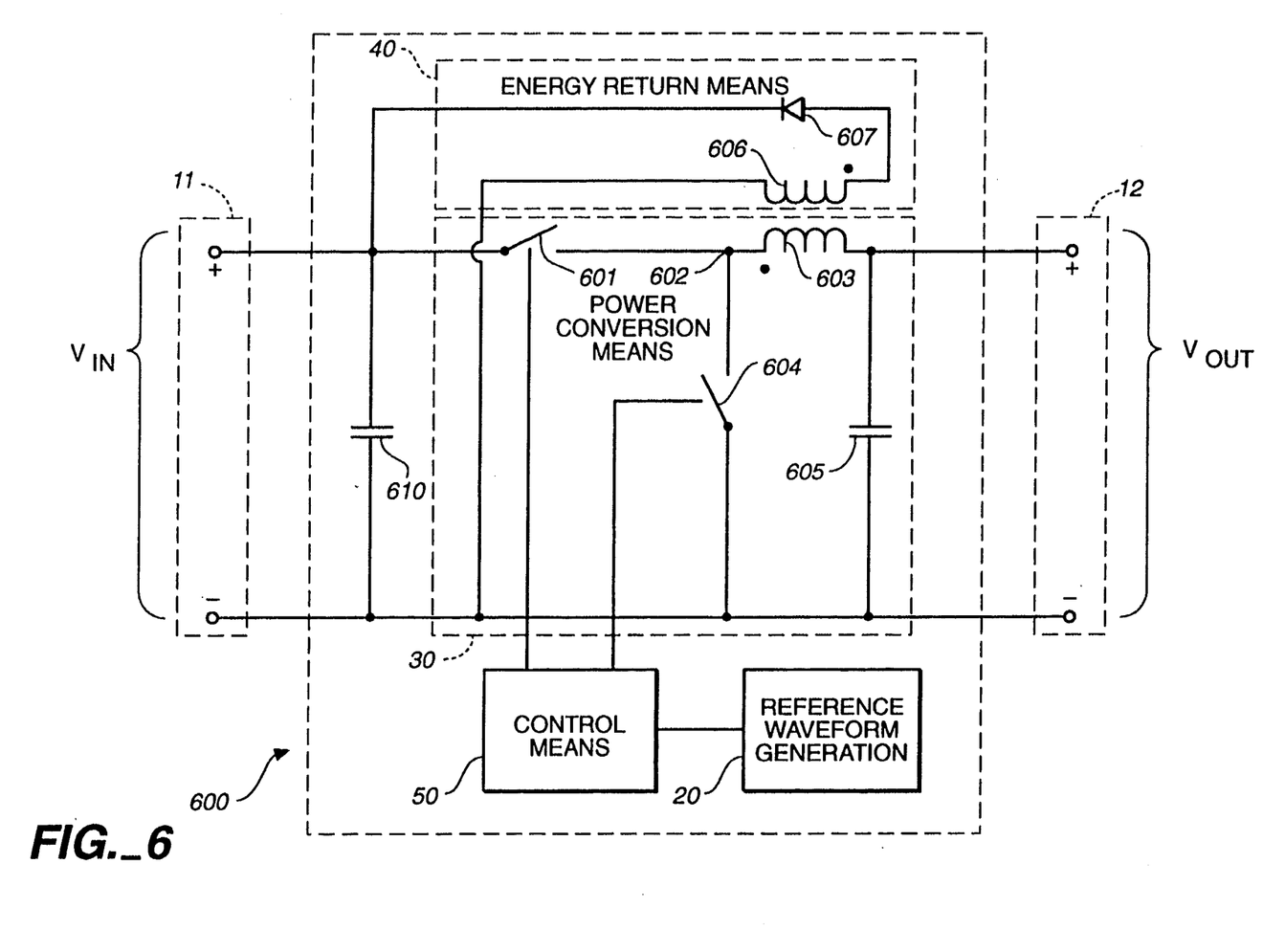
FIG. 6 is a circuit diagram of a third embodiment of the present invention.

A third embodiment of an electrical power inverter according to the present invention is shown at 600 in FIG. 6. Electrical power inverter 600 includes input port 11 and output port 12, waveform generator 20, conversion means 30, energy return means 40, and control means 50 each having the basic functionalities described above in connection with FIG. 1.

In this embodiment, power conversion means 30 comprises a first switch means 601 coupled between the positive terminal of input port 11 and a node 602. A first inductor 603 is coupled between node 602 and the positive terminal of output port 12. A second switch means 604 is coupled between node 602 and the negative terminal of output port 12. A capacitor 605 is coupled between the positive and negative terminals of output port 12.

It may be appreciated that switch means 601, node 602, inductor 603, switch means 604, and capacitor 605 collectively comprise a buck inverter, which is well known in the art. Electrical power inverter 600 further comprises a second inductor 606 magnetically coupled to first inductor 603 in a flyback relationship, and a diode 607 coupled between inductor 606 and input port 11 such that electrical energy can flow substantially only in the direction from inductor 606 to input port 11. It will be appreciated that inductor 606 and diode 607 collectively comprise an energy return means 40 which is substantially identical to the energy return means described in connection with electrical power inverter 100, which is shown in FIG. 2.

In this embodiment, control means 50 receives a reference waveform from reference waveform generator 20 and controls switch means 601 and 604 such that the output voltage on capacitor 605 is allowed to ramp up and ramp down with a frequency substantially greater than the frequency of the reference waveform. The peak voltages of capacitor 605 are modulated so that the output voltage waveform approximately corresponds to the reference waveform. The detailed operation of control means 50 will not be described as it is substantially similar to the control means described in connection with electrical power inverter 100, except that only two switches are operated, switch means 601 and switch means 604, rather than the three switches of electrical power inverter 100.

Electrical power inverter 600 also comprises an input capacitor 610 which is identical in function to the input capacitor 111 described in connection with electrical power inverter 100.

While the present invention has been particularly described with respect to the illustrated embodiments, it will be appreciated that various alterations, modifications, and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, to the contrary, is intended to cover various modifications and equivalent arrangements included within the scope of the appended claims.

What is claimed is:

1. An electrical power inverter comprising:
an input port for receiving a source of electrical energy having a unipolar input voltage, and an output port for providing electrical energy to a load;
means for generating a reference waveform;
power conversion means for generating an output voltage at said output port having a waveform which approximately corresponds to said reference waveform, said power conversion means comprising an energy storage means coupled to said output port for storing energy at said output port and for generating said output voltage as a function of the amount of stored energy, and energy coupling means for coupling energy from said input port to said output port in amounts needed to supply energy to the load and to enable said energy storage means to generate said output voltage;
energy return means for selectively coupling energy from said output port to said input port; and
control means for enabling said energy return means to selectively couple excess energy from the output port such that the output voltage waveform more closely corresponds to said reference waveform under a wide range of load conditions, said excess energy being that energy which is in excess of the sum of the energy needed by the load plus the energy needed by said energy storage means to generate said output voltage.

2. The electrical power inverter of claim 1 wherein said unipolar input voltage comprises a DC voltage.

3. The electrical power inverter of claim 1 wherein said reference waveform comprises a periodic waveform having a reference frequency.

4. The electrical power inverter of claim 1 wherein said energy storage means comprises a capacitor.

5. The electrical power inverter of claim 3 wherein said output port includes a first terminal and second terminal and wherein said energy coupling means comprises:
a node;
a first inductor coupled between said node and the first terminal of said output port;
a means for selectively coupling electrical energy from said input port to said node at a switching frequency substantially greater than said reference frequency, said means for selectively coupling electrical energy having a first state in which electrical energy is coupled to said node and a second state in which electrical energy is substantially prevented from coupling to said node, wherein the duration of the first state of said means for selectively coupling electrical energy is controlled by said control means such that said output voltage waveform approximately corresponds to said reference waveform; and a commutating switch means coupled between said node and the second terminal of said output port for enabling said first inductor to couple energy to said output port when energy is not coupled to said first inductor by said selective coupling means.

6. The electrical power inverter of claim 5 wherein said means for selectively coupling electrical energy comprises:

a transformer having a first primary winding and a second primary winding each coupled to said input port and a first secondary winding and a second secondary winding each coupled to said node;

a first switch means coupled to said first primary winding for alternately enabling electrical energy to couple from said input port to said first primary winding at a switching frequency substantially greater than said reference frequency, and a second switch means for alternately enabling electrical energy to couple from said input port to said second primary winding at a switching frequency substantially greater than said reference frequency, said first and second switch means each having ON states in which electrical energy is enabled to couple to said first and second primary windings, respectively, and OFF states in which electrical energy is substantially prevented from coupling to said first and second primary windings, respectively, wherein said first switch means and said second switch means are not in their respective ON states at the same time;

a first rectifier coupled to said first secondary winding such that electrical energy is enabled to couple substantially only in the direction from said first secondary winding to said node;

a second rectifier coupled to said second secondary winding such that electrical energy is enabled to couple substantially only in the direction from said second secondary winding to said node.

7. The electrical power inverter of claim 5 wherein said energy return means comprises a second inductor magnetically coupled in a flyback relationship to said first inductor, said second inductor being coupled to said input port and a return rectifier coupled to said second inductor such that electrical energy is enabled to couple through said second inductor substantially only in the direction from said second inductor to said input port;

and wherein said commutating switch means is further for alternately enabling electrical energy to be coupled from said output port through said first inductor at a switching frequency substantially greater than said reference frequency, said commutating switch means having an ON state in which electrical energy is enabled to couple from said output port through said first inductor and an OFF state in which electrical energy is substantially prevented from coupling from said output port through said first inductor, wherein the duration of the ON state of said commutating switch means is controlled by said control means such that the output voltage waveform more closely corresponds to said reference waveform under a wide range of load conditions and such that said means for selectively coupling electrical energy is not in its first state at the same time said commutating switch means is in its ON state.

8. The electrical power inverter of claim 1 wherein said control means further comprises detection means for measuring said output voltage and wherein said control means is responsive to said output voltage.

9. The electrical power inverter of claim 8 wherein said reference waveform comprises a voltage waveform and said control means is responsive to the difference between said output voltage and the voltage of said reference waveform.

10. The electrical power inverter of claim 3 further comprising a bridge inverter coupled between said output port and said load such that said output voltage is inverted during alternate voltage half-cycles of said output voltage waveform.

11. The electrical power inverter of claim 3 wherein said reference waveform approximates a full-wave rectified sinusoid.

12. The electrical power inverter of claim 11 further comprising a bridge inverter coupled between said output port and said load such that said output voltage is inverted during alternate voltage cycles of said output voltage waveform.

13. The electrical power inverter of claim 11 wherein said reference frequency is approximately 100 Hz.

14. The electrical power inverter of claim 1 further comprising an input capacitor coupled to said input port for storing electrical energy returned to said input port by said energy return means.

15. An electrical power inverter comprising:

an input port for receiving a source of electrical energy having a unipolar input voltage and an output port for providing electrical energy to a load, said output port including first and second terminals;

means for generating a reference waveform having a reference frequency;

a first transformer having a first primary winding and a second primary winding each coupled to said input port and at least one secondary winding;

first switch means coupled to said first primary winding for alternately enabling electrical energy to couple from said input port to said first primary winding at a switching frequency substantially greater than said reference frequency, and a second switch means for alternately enabling electrical energy to couple from said input port to said second primary winding at a switching frequency substantially greater than said reference frequency, said first and second switch means each having ON states in which electrical energy is enabled to couple to said first and second primary windings, respectively, and OFF states in which electrical energy is substantially prevented from coupling to said first and second primary windings, respectively, wherein said first switch means and said second switch means are not in their respective ON states at the same time;

a node coupled to said secondary winding;

a first rectifier coupled to said secondary winding such that electrical energy is enabled to couple substantially only in the direction from said secondary winding to said node;

a capacitor coupled to the first terminal of said output port such that electrical energy coupled to said output port is enabled to be stored on said capacitor, said capacitor having an output voltage that is a function of the amount of stored energy;

a return transformer having a primary winding and a secondary winding coupled in a flyback relationship, wherein the primary winding of said return transformer is coupled between said node and the first terminal of said output port and the secondary winding of said return transformer is coupled to said input port;

third switch means coupled between said node and the second terminal of said output port for alternately enabling electrical energy to couple from said output port through said primary winding of said return transformer at a frequency substantially greater than said reference frequency, said third switch means having an ON state in which electrical energy is enabled to couple from said output port through said primary winding of said return transformer and an OFF state in which electrical energy is substantially prevented from coupling from said output port through said primary winding of said return transformer;

a second rectifier coupled to said secondary winding of said return transformer such that electrical energy is enabled to couple substantially only in the direction from said secondary winding of said return transformer to said input port; and control means for controlling said first, second, and third switch means to generate said output voltage with an output voltage waveform that closely corresponds to said reference waveform, said control means controlling the duration of the ON states of said first and second switch means such that said output voltage waveform is caused to approximately correspond to said reference waveform, and controlling the duration of the ON state of said third switch means such that energy is selectively coupled from said output port to cause said output voltage waveform to more closely correspond to said reference waveform under a wide range of load conditions, and controlling said first, second, and third switch means such that only one of them is in its ON state at one time.

* * * * *